United States Patent [19]

Gloersen

[11] 4,033,811

[45] July 5, 1977

[54] METHOD AND APPARATUS FOR FILLING OF FIBER MATERIAL AND LIQUID TO STEAM PHASE IN TREATMENT VESSEL

[75] Inventor: Stig Torleif Gloersen, Karlstad, Sweden

[73] Assignee: Stig Gloersen, Karlstad, Sweden

[22] Filed: June 9, 1975

[21] Appl. No.: 584,903

[52] U.S. Cl. .................... 162/17; 162/19; 162/40; 162/52; 162/237; 162/238; 162/246; 222/194; 214/17 CC
[51] Int. Cl.² .............. D21C 1/02; D21C 7/06
[58] Field of Search ............ 162/52, 237, 246, 17, 162/19, 37, 47, 40, 239, 238; 214/17 CB, 17 CC; 222/194, 370; 73/23.1 (U.S. only); 137/624.18

[56] References Cited

UNITED STATES PATENTS

| | | | |
|---|---|---|---|
| 2,680,683 | 6/1954 | Obenshain | 162/237 |
| 3,007,839 | 11/1961 | Richter | 162/17 |
| 3,429,773 | 2/1969 | Richter | 162/237 |
| 3,433,392 | 3/1969 | Roerig et al. | 222/194 |
| 3,441,475 | 4/1969 | Tomlinson | 162/237 |
| 3,537,953 | 11/1970 | Brown et al. | 162/52 |
| 3,585,002 | 6/1971 | Boys | 73/23.1 |
| 3,921,918 | 11/1975 | Peterson | 162/47 |

FOREIGN PATENTS OR APPLICATIONS 165,680   12/1950   Sweden .......................... 162/52

Primary Examiner—S. Leon Bashore
Assistant Examiner—Steve Alvo
Attorney, Agent, or Firm—Cushman, Darby & Cushman

[57] ABSTRACT

A method and apparatus for filling a treatment vessel, such as a digestor, with fiber material and liquid. A chips-liquid mixture from a pretreatment vessel is fed through a conventional feeding valve to a treatment vessel while the chips-liquid mixture is being acted on by other means in the feeding valve. The feeding valve includes a rotor having a number of pockets extending therethrough, and a plurality of inlets and outlets arranged around the periphery of the valve for communication with the pockets thereof. In a first position of the valve chips-liquid mixture is fed into a pocket, and a portion of the liquid is strained off, then the valve rotates to a second position wherein a quantity of the liquid is displaced by gas or steam while the chips are maintained in the pocket, and then the valve rotates to a third position wherein the chips in the pocket are discharged into the treatment vessel. After discharge of the chips into the treatment vessel the valve rotates to a fourth position wherein the steam in the pocket is discharged to a pretreatment vessel and the pocket is filled with liquid so that it is filled with liquid when it is rotated back to its first position.

13 Claims, 2 Drawing Figures

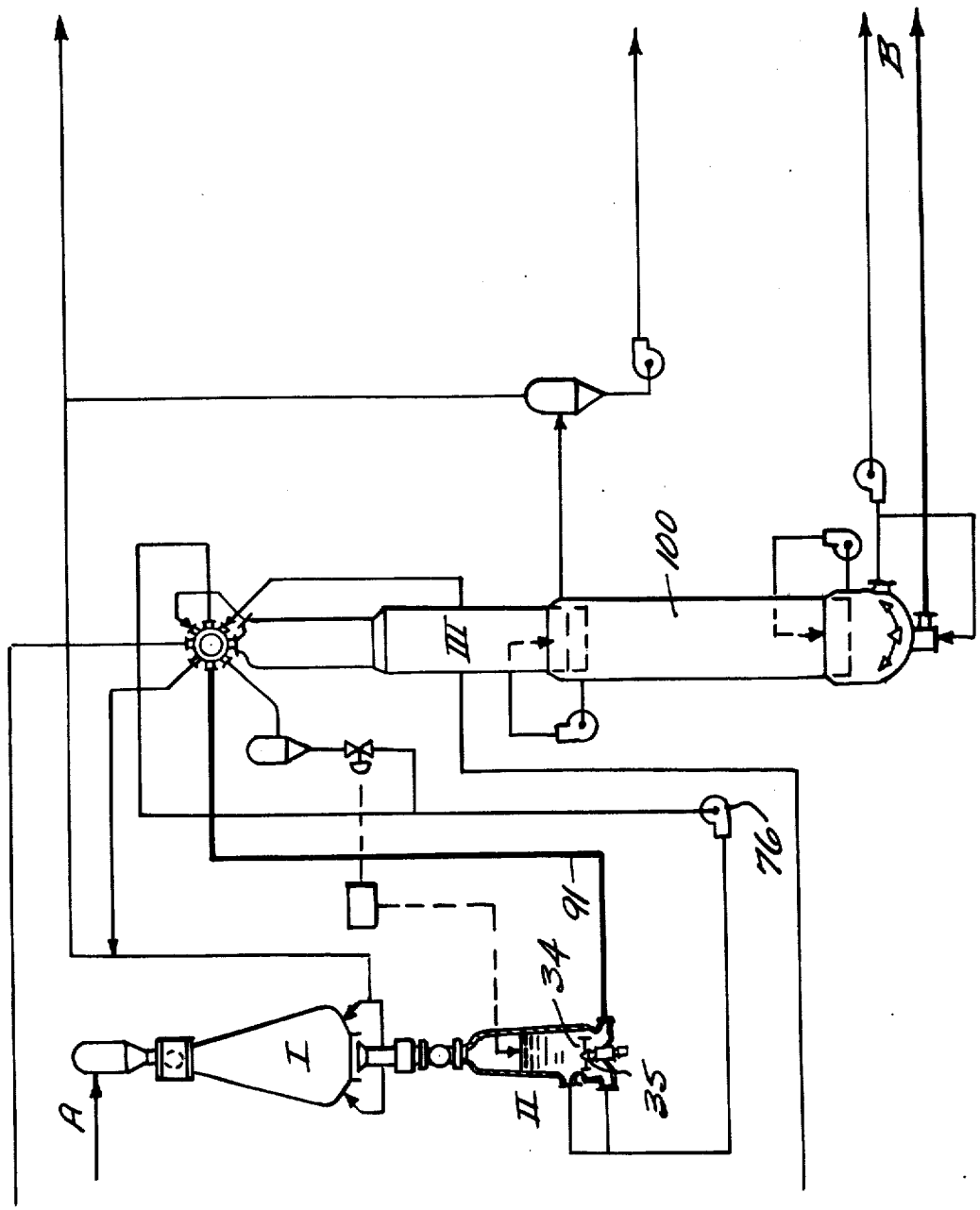

METHOD AND APPARATUS FOR FILLING OF FIBER MATERIAL AND LIQUID TO STEAM PHASE IN TREATMENT VESSEL

BACKGROUND AND SUMMARY OF THE INVENTION

The invention relates to a method and apparatus for filling of cellulose containing fiber material and liquid to steam phase in a preferably continuously working treatment vessel (a digester) at superatmospheric pressure for pulp production.

The main object of the invention is, in a simple way, to be able to feed into a treatment vessel and regulate the quantity of treatment liquid and fiber material so that the ratio between fiber material and liquid, (the wood/liquid ratio), will be as close as possible to the desired ratio for the process and cooking parameters which are desired.

Swedish Pat. No. 128,264 (see U.S. Pat. No. 2,680,683 also), which shows a feeding valve which mainly consists of a housing and a rotating rotor with pockets therein, which pockets are periodically filled and emptied, discloses conventional prior art apparatus. With such conventional apparatus it is possible with relatively good precision, to feed into a treatment vessel, a distinct quantity per unit of time of fiber material. With such conventional feed-in apparatus, the emptying of a rotor pocket takes place by turning the rotor so that the pocket communicates with an outer circulation pipe with ends connected to the digester and in which cooking liquor is being circulated. Thereby the fiber material is transported by the cooking liquor and is fed into the digester. When the pocket in such a device has emptied its content of fiber material, it is completely filled with cooking liquor of a volume which is greater than the volume of the cooking liquor which was present in the pocket just before it emptied its fiber material content. This means that the digester, when the feeder rotor is continuing to turn, has had a liquor volume corresponding to the volume of the fed-in fiber material tapped therefrom. In order to maintain the liquid balance of the digester, then, it is necessary by some accessory means to feed a quantity of liquid corresponding to the tapped-out quantity, into the digester as well as possible additional fresh treatment liquid. This often necessitates the utilization of high pressure pumps.

The present invention discloses a new method and an apparatus enabling to feed a digester with desired fiber material and necessary predetermined desired quantity of treatment liquid. Herewith due regard is taken not only to the necessary quantity fresh treatment liquid for the digesting process but also to the quantity of moisture in the fiber materials and also the quantity of condensate from the pretreatment as well as leakage from the high pressure side of the feeder to its low pressure side.

BRIEF DESCRIPTION OF THE DRAWINGS

FIG. 2 shows a flow sheet for an exemplary installation according to the present invention.

DETAILED DESCRIPTION OF THE DRAWINGS

Figure 1:
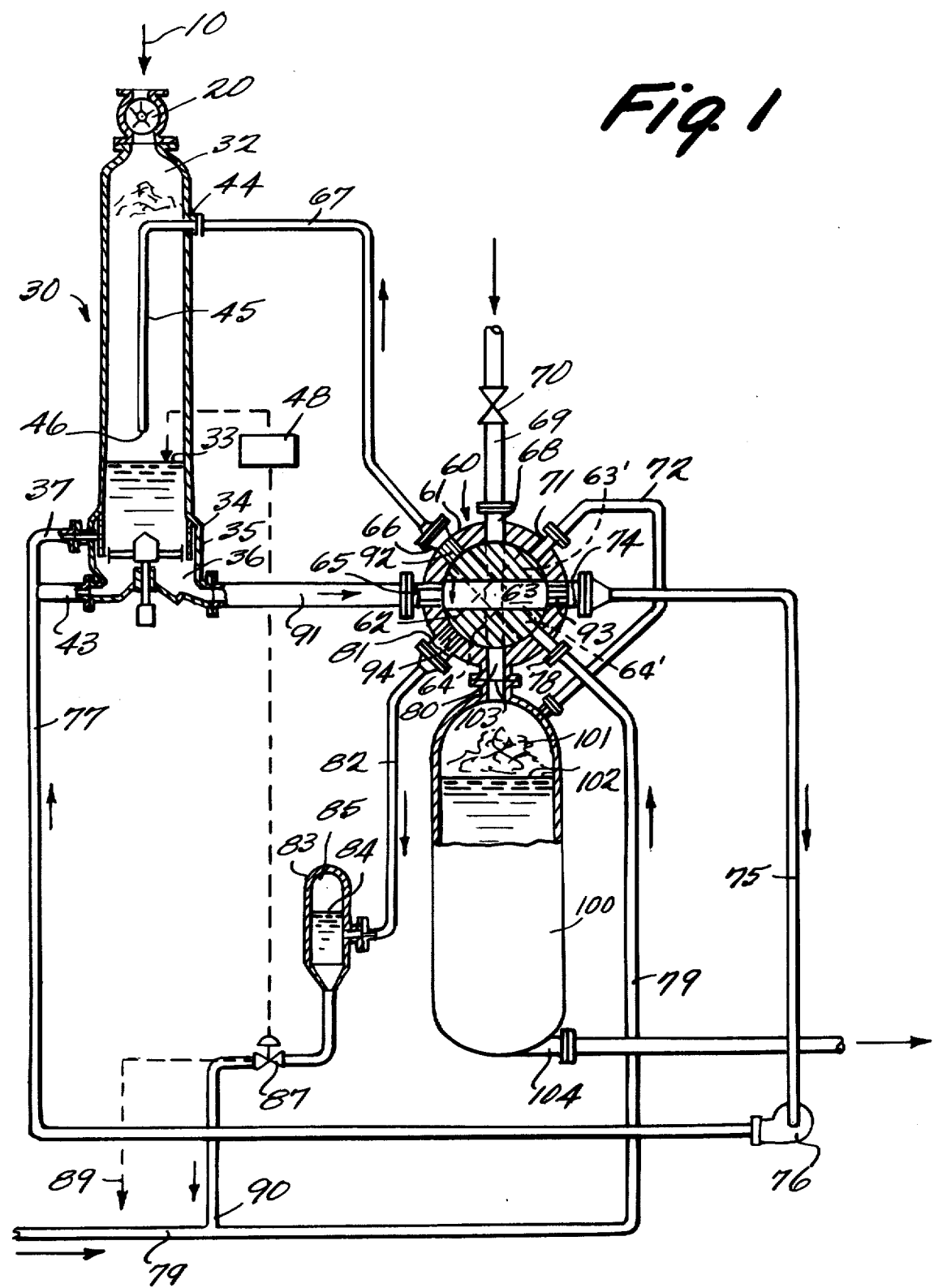
FIG. 1 shows schematically an exemplary digester feed-in system according to the present invention.

In FIG. 1 item 30 designates a pre-treatment vessel, 60 a conventional feed device of the cellfeeder type, and 100 a treatment vessel or digester. When the pre-treatment vessel 30 is working at atmospheric pressure, finely comminuted fiber material, for example wood chips 10, can be fed into vessel 30 by means of an open type charging device 20 or the like. When pre-impregnation vessel 30 is working at super-atmospheric pressure or at vacuum the fiber material 10 can be fed into vessel 30 by means of a cellfeeder or the like which is closed against the prevailing super pressure. The vessel 30 may be a generally conical container with circular cross-section with a feed-out part 34 directly connected at the lower end thereof, in which a driven feed-out device 35 is rotatable. The device 35 may be a conventional "rotating table", which during its rotation feeds a certain quantity of fiber material downwardly to the chamber 36. The chamber 36 is part of a circulation circuit consisting of the pipe 91, feeder 60 through the connections 65 and 74, a pipe 75, a pump 76, and a pipe 77. The pipe 77 may be equipped with a branch 37 connected before chamber 36 for dilution over the table 35.

The feeder 60 consists mainly of a housing 61 with a generally conical hole, in which a rotor 62 rotates powered by a motor (not shown). The rotor is correspondingly conical and as housing and rotor wear, the rotor can be adjusted in an axial direction so that the sealing is maintained. The feeder rotor 62 is equipped with a number (i.e four) of separate through-going pockets, such as shown at 63, 63', 64, and 64' in FIG. 1. When the feeder rotor 62 is rotating, the rotor pockets come one after the other into communication with openins distributed around the periphery of the housing 61, which openings may have normal pipe connections. Each such opening in the housing has a diametrically opposed opening which means that when one end of a rotor pocket is passing an opening, the other end of the pocket is simultaneously passing a diametrically opposed opening, which allows a flow through the feeder pocket. One or more of the openings in the feeder housing can be equipped with a screening device. In FIG. 1 three such screening devices are shown, 92, 93, and 94.

The feeder housing illustrated in the drawings has eight openings in the periphery and also eight connection pieces, at least one of which, connection piece 68, is connected to a high pressure gas or steam line 69 equipped with a valve 70 which is arranged so that the opening and closing thereof are synchronized with the feeder rotor rotation, — that is valve 70 opens each time a feeder pocket passes therepast whereby the pocket content is "blown"through the opposite connection pieces 80 and 103 into the digester 100.

A part of the liquid of the chip-liquid-mixture which arrives at the feeder 60 through the pipe line 91 is screened off by means of screen 93 and this screened liquid passes through connection piece 74 connected to the line 75, in which a flow is maintained by means of circulation pump 76. The pressure side of pump 76 line 75 is connected with the feed-out part 34 of the pre-impregnation vessel 30 by line 77.

Connection piece 81 of the feeder housing is connected to line 82, through which liquid screened off by screen 94 flows to a container 83, in which a liquid level 84 is maintained with a steam chamber 85 on top. At the outlet side of the chamber 83 the line 86 leads to a control valve 87 which receives opening and closing impulses from the level indicator 48, which is responsive to level 33. On the other side of the valve 87 the line 90 goes to above mentioned line 79. Diametrically opposed to the connection piece 81 on the feeder the connection piece 71 is located, which, through line 72, is in open communication with the steam area over the liquid level 102 in the digester 100. Alternatively, the connection piece 71 can be connected directly to a steam line coming from the outside.

Opposite connection piece 78, through which fresh cooking liquor flows from the line 79, is disposed the connection piece 66 which eventually has an inside screen 92. The connection piece 66 is connected to the line 67 primarily for leading expanding steam from the feeder pockets to the connection piece 44 and the line 45 with an outlet 46 which may be located centrally in the pre-treatment vessel 30 and above the liquid level 33.

In the digester 100 a level 101 of fiber material is maintained in addition to liquid level 102. This level can, as shown, lie above the liquid level but eventually may lie under the liquid level. The lower portions of the digester may include conventional screens for extracting liquid and devices for the addition of cooking or other liquids after cooling or heating, conventional fiber material washing apparatus and cooling liquid feed-in apparatus for finally treating the fiber material before it leaves the digester through the connection piece 104.

The finely comminuted fiber material is fed into the pre-impregnation vessel 30 by means of charging apparatus 20 and assumes a level 32 in the vessel 30 which level is regulated by a gamma level regulator (not shown) or the like. A liquid level 33 is also maintained in the vessel 30 by means of level indicator 48 which controls the valve 87. The pre-impregnation vessel 30 functions in such a way that substantially the same quantity of fiber material is fed-in through the charging device 20 as the quantity which is fed-out of the device in its lower part through line 91 to the feeder 60. The constant liquid level 33 is maintained since the outgoing liquid quantity corresponds in volume to the ingoing quantity. The ingoing liquid quantity consists partly of (a) the moisture following the fiber material, partly of condensate from incoming steam or gases, which from the feeder through line 67 is fed into the pre-impregnation vessel at 46, as well as (b) the possible additional charging of steam to the pre-impregnation vessel 30 through another line (not shown) and (c) fresh cooking liquor added through line 79 which via the feeder 60 is fed into the system and through line 77 is fed into the lower part of pre-impregnation vessel 30.

The liquid quantity drawn from the pre-impregnation vessel 30 consists of liquid which follows the fiber material through line 91 to the feeder connection piece 65, partly as liquid absorbed in, and partly around the fiber material. From this quantity of liquid which follows the fiber material there is extracted a quantity of liquid through the screen 93, which quantity is circulated back to the pre-impregnation vessel through line 75, the pump 76, and the line 77. When this extraction is taking place, a feeder pocket is in communication with the connection pieces 65 and 74. The feeder rotor rotates counter-clockwise. When the above-mentioned feeder pocket has turned to position 81, 71, the pocket is filled with gas or steam of high pressure from the digester steam chamber through line 72 or by means of fresh gas or steam through an accessory connection (not shown). When the pocket is put under pressure, part of the liquid in and around the fiber material is pressed out through the screen 94 and is re-circulated via line 82, tank 83, line 86, valve 87, line 90 and is mixed with fresh cooking liquor in line 79. When a feeder pocket is in position 81, 71 another pocket is simultaneously is position 66, 78, and simultaneously a third in position 65, 74, and a fourth in position 68, 80, which insures a continuous ingoing and outgoing flow is always maintained through the feeder 60. The pockets can be spaced lengthwise in the feeder rotor and must not be able to communicate with each other.

The quantity of liquid which drains off in screen 94 is regulated by valve 87 which in turn, via level indicator 48, maintains a constant level 33 in the impregnation vessel 30. The remaining quantity of liquid in a feeder pocket in position 81, 71 constitutes the desired cooking liquor quantity for the process and is by means of high pressure gas or steam fed from line 69 together with fiber material into the digester 100 through pipe connection 80 and digester connection 103. The synchronized valve 70 opens each time a rotor pocket comes into position 68, 80. The liquid quantity which is fed into the digester in this manner is the only quantity which leaves the feed-in system, since the remaining liquid quantity which leaves the pre-impregnation vessel 30 in different ways circulates back to the pre-impregnation vessel as described above.

After a pocket is emptied in position 68, 80 of its content of liquid and fiber material, the pocket is filled with steam of the same pressure as steam in the digester. During the continued rotation of the feeder rotor, the pocket thereafter comes into position 66, 78, whereby the steam in the pocket expands and the pressure is reduced to the prevailing pressure in the feed-in system due to the fact that the pocket comes into connection with line 67 which leads to the impregnation vessel 30. In position 66, 78 an after-filling of the pocket with cooking liquor also takes place through line 79 before the feeder rotor turns to position 65, 74, in which position the feeder rotor has rotated a half revolution and a cycle is completed.

If for certain reasons it is not desired to allow the liquid from the pre-treatment, which according to the above-described method is re-circulated through line 90, to enter into the cooking process itself, the liquid can alternatively be led out of the system through the line 89 (dotted in FIG. 1). All free liquid can in such a case be drained from the fiber material in position 81, 71, and in such a way the impregnated fiber material can be fed into the digester in position 68, 80 without any free liquid. This can be the case for example if the pre-treatment is a pre-hydrolysis treatment and it is desired that the hydrolysate not be mixed with the fresh treatment liquid.

FIG. 2 shows as an example a simplified flow-chart in which the present invention is incorporated. The flow-sheet consists of I) vessel for atmospheric steaming in which the finely comminuted fiber material comes into the system, II) vessel for low pressure impregnation and III) digester with steam phase in the top. The fiber material is fed in at A. The feeder 60 has in this case been placed on top of the digester 100 and the pre-impregnation vessel has been placed at a low level in relation to the feeder. The in-going liquid flow to the feed-out part 34 takes the fiber material which has been fed down by the table 35 out in the line 91 to the feeder 60. The digester 100 itself can be conventional, with built-in washing in the digester lower part. The ready washed fiber material is thereafter blown out of the container in a conventional manner at B.

While the invention has been herein shown and described in what is presently conceived to be the most practical and preferred embodiment, it will be apparent to one of ordinary skill in the art that many modifications may be made thereof within the scope of the invention, which scope is to be accorded the broadest interpretation of the appended claims so as to encompass all equivalent methods and devices.

What is claimed is:

1. A method of filling a pressure treatment vessel having a steam phase and operatively connected to a pretreatment vessel with a chips-liquid mixture utilizing apparatus having a pocket of given dimensions, said method comprising the steps of sequentially and continuously establishing a flow of chips-liquid mixture from the pretreatment vessel along a first path into the liquid-filled pocket, depositing a chips-liquid mixture of given volume into the pocket while displacing liquid already in the pocket and removing it therefrom;

admitting gas under pressure to the pocket to expell at least a portion of the liquid therefrom while maintaining the chips in the pocket, so that a desired volume of liquid to be admitted with chips into the pessure treatment vessel is provided in the pocket, discharging the chips-liquid mixture in the pocket into the steam phase of the pressure treatment vessel by displacing the chips-liquid mixture from the pocket with gas, discharging the gas from the pocket into the pretreatment vessel and simultaneously filling the pocket with liquid so that the pocket is filled with liquid when another chips-liquid mixture is deposited therein, and sequentially continuously repeating all the above steps.

2. A method as recited in claim 1 wherein said apparatus containing the pocket therein includes a rotor having the pocket extending completely therethrough for simultaneous communication with an inlet and outlet thereto, and wherein said depositing, admitting, discharging, and discharging and filling steps are accomplished by rotating said rotor past four sets of cooperating inlets and outlets.

3. A method as recited in claim 2 wherein said rotor has four non-communicating pockets extending therethrough, and wherein all of said method steps continuously take place, communication between one set of inlets and outlets and a pocket taking place at all times.

4. A method as recited in claim 1 wherein the gas admitted to the pocket to expell at least a portion of the liquid therefrom is steam and is fed to the pocket from the steam phase of the pressure vessel.

5. A method as recited in claim 1 wherein the gas is steam and wherein the liquid displaced by the gas admitted to the pocket while the chips are maintained in the pocket is recirculated to the pocket and ultimately to the pretreatment vessel.

6. A method as recited in claim 5 wherein the volume of liquid displaced by gas while the chips are maintained in the pocket is controlled so that it is dependent upon the level of liquid in the pretreatment vessel.

7. A method as recited in claim 1 wherein substantially all of the liquid is displaced from the pocket by the gas admitted to the pocket during the admitting and expelling step so that the liquid from the pretreatment vessel does not enter the pressure treatment vessel, but rather only the chips do.

8. A method as recited in claim 1 wherein said step of depositing a chips-liquid mixture into the pocket while displacing liquid already in the pocket and removing it therefrom is accomplished by screening, and wherein said step of expelling a portion of the liquid from the pocket while maintaining the chips therein is accomplished by screening.

9. Apparatus for filling a pressure treatment vessel having a steam phase operatively connected to a pretreatment vessel with a chips-liquid mixture, said apparatus comprising a rotary valve member having member having four noncommunicating pockets extending therethrough each for providing communication between an inlet and an outlet, means for depositing a chips-liquid mixture into one of said pockets while displacing liquid in the pocket from the pocket at a first position of said valve member, said means including a first inlet and a first outlet, means for admitting gas under pressure to one of said pockets to expell at least a portion of the liquid therefrom while maintaining the chips in the pocket at a second position of said valve member, so that the desire volume of liquid to be admitted with chips into the pressure treatment vessel is provided in the pocket, said means including a second inlet and a second outlet, means for discharging the chips-liquid mixture from one of said pockets into the steam phase of said pressure treatment vessel at a third position of said valve member by displacing the chips-liquid mixture from the pocket with gas, said means including a third inlet and a third outlet, means for discharging the gas from one of said pockets into said pretreatment vessel and simultaneously filling the pocket with liquid at a fourth position of said valve member so that the pocket is filled with liquid when another chips-liquid mixture is deposited therein, said means including a fourth inlet and a fourth outlet, and means for continuously sequentially rotating said valve member about an axis of rotation from said first to said second to said third to said fourth and back to said first position.

10. Apparatus as recited in claim 9 further comprising means for circulating liquid expelled from said second outlet back to said rotary valve member fourth inlet, and further comprising means for recirculating liquid displaced from said first outlet back to said pretreatment vessel.

11. Apparatus as recited in claim 10 further comprising means for controlling the amount of liquid withdrawn through said second outlet in response to the level of liquid in said pretreatment vessel.

12. Apparatus as recited in claim 9 wherein each of said pockets extend in a direction perpendicular to the axis of rotation of said valve member.

13. Apparatus as recited in claim 9 wherein said means for admitting gas under pressure from the pocket at the second position of said valve member includes means for expelling substantially all of the liquid from the pocket through said second outlet so that substantially no liquid from the pretreatment vessel enters the pressure treatment vessel.

* * * * *